(12) United States Patent
Schilke et al.

(10) Patent No.: US 9,170,125 B2
(45) Date of Patent: Oct. 27, 2015

(54) PRESENTING WEATHER INFORMATION ON A DISPLAY

(75) Inventors: Christina Schilke, Vreden (DE); Thomas Grasse, Dietzenbach (DE)

(73) Assignee: THE BOEING COMPANY, Chicago, IL (US)

( * ) Notice: Subject to any disclaimer, the term of this patent is extended or adjusted under 35 U.S.C. 154(b) by 2180 days.

(21) Appl. No.: 12/204,756

(22) Filed: Sep. 4, 2008

(65) Prior Publication Data

US 2010/0057275 A1 Mar. 4, 2010

(51) Int. Cl.
G01C 23/00 (2006.01)
G01W 1/06 (2006.01)

(52) U.S. Cl.
CPC . *G01C 23/00* (2013.01); *G01W 1/06* (2013.01)

(58) Field of Classification Search
CPC .................................. G01C 23/00; G01W 1/06
USPC .............. 701/3, 9, 10, 14; 340/945, 949, 963, 340/968; 342/26 B; 345/619, 629, 634–637; 715/768; 702/3–5
See application file for complete search history.

(56) References Cited

U.S. PATENT DOCUMENTS

| | | | |
|---|---|---|---|
| 2,628,442 A * | 2/1953 | Blewett | 40/495 |
| 5,198,819 A * | 3/1993 | Susnjara | 342/26 B |
| 5,265,024 A * | 11/1993 | Crabill et al. | 701/538 |
| 6,184,816 B1 * | 2/2001 | Zheng et al. | 342/26 R |
| 6,289,277 B1 | 9/2001 | Feyereisen et al. | |
| 6,389,355 B1 * | 5/2002 | Gibbs et al. | 701/467 |
| 6,456,226 B1 * | 9/2002 | Zheng et al. | 342/26 R |
| 6,653,947 B2 | 11/2003 | Dwyer et al. | |
| 7,161,525 B1 * | 1/2007 | Finley et al. | 342/26 R |
| 7,417,579 B1 * | 8/2008 | Woodell | 342/26 B |
| 7,471,995 B1 * | 12/2008 | Robinson | 701/3 |
| 7,515,069 B2 * | 4/2009 | Dorneich et al. | 340/945 |
| 7,612,688 B1 | 11/2009 | Vigeant-Langlois et al. | |
| 7,667,621 B2 | 2/2010 | Dias et al. | |
| 7,908,045 B1 * | 3/2011 | McCusker | 701/9 |
| 8,050,864 B2 | 11/2011 | Schilke et al. | |
| 2002/0039072 A1 * | 4/2002 | Gremmert et al. | 340/945 |
| 2004/0239550 A1 * | 12/2004 | Daly, Jr. | 342/26 B |
| 2005/0246071 A1 * | 11/2005 | Chamas et al. | 701/3 |

(Continued)

OTHER PUBLICATIONS

USPTO office action for U.S. Appl. No. 12/204,761 dated Dec. 30, 2010.

(Continued)

*Primary Examiner* — John Q Nguyen
*Assistant Examiner* — Michael Whalen
(74) *Attorney, Agent, or Firm* — Yee & Associates, P.C.

(57) ABSTRACT

A method is present for presenting weather information. A number of weather conditions for a geographic region is identified from weather data for the geographic region. A geometry is selected for a weather condition based on a type of the weather condition to form a number of geometries. Each geometry within the number of geometries has a level of transparency within a corresponding border allowing another geometry to be identified when displayed in an overlapping manner. A spatial extension is selected for the each geometry within the number of geometries based on an extent of an associated weather condition to form the number of geometries. The number of geometries is displayed on a map of the geographic region in which the number of geometries is displayed in locations on the map corresponding to locations of the number of weather conditions in the geographic region.

18 Claims, 10 Drawing Sheets

(56) References Cited

U.S. PATENT DOCUMENTS

| | | |
|---|---|---|
| 2006/0129286 A1* | 6/2006 | King .................................. 701/4 |
| 2006/0217853 A1* | 9/2006 | Servantie et al. .................. 701/4 |
| 2010/0057362 A1 | 3/2010 | Schilke et al. |
| 2011/0098871 A1* | 4/2011 | Buchanan et al. .............. 701/14 |
| 2011/0187588 A1* | 8/2011 | Khatwa et al. .............. 342/26 B |

OTHER PUBLICATIONS

USPTO Notice of Allowance for U.S. Appl. No. 12/204,761 dated May 13, 2011.

* cited by examiner

| SYMBOL | WEATHER CONDITION |
|---|---|
| 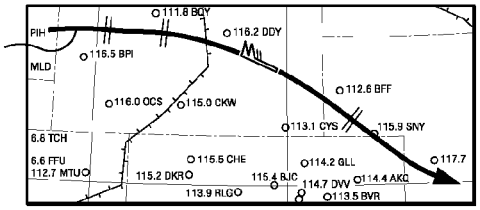 602 | JET STREAM |
| 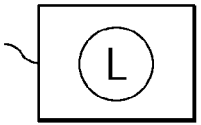 604 | TROPICAL DEPRESSION |
|  606 | TROPICAL STORM |
| 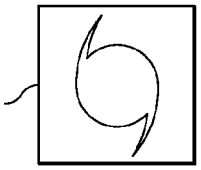 608 | HURRICANE |
| 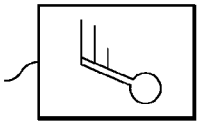 610 | WIND |
| 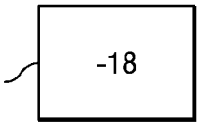 612 | TEMPERATURE |
*FIG. 6*

| GEOMETRY | WEATHER CONDITION |
|---|---|
| 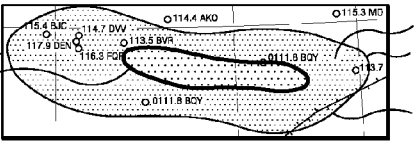 702, 722, 720, 716, 718 | VISIBILITY |
| 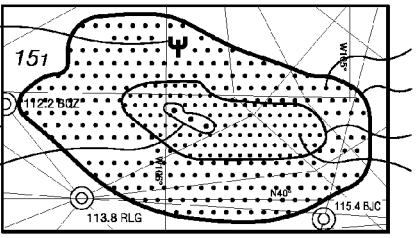 731, 704, 727, 728, 724, 726, 730 | ICING |
| 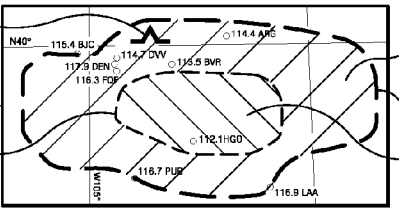 739, 706, 734, 736, 732, 738 | TURBULENCE |
| 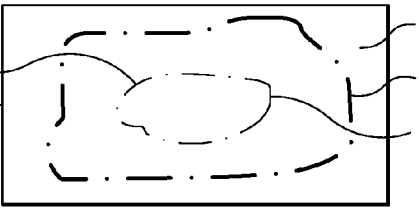 746, 708, 744, 740, 742 | RAIN |
| 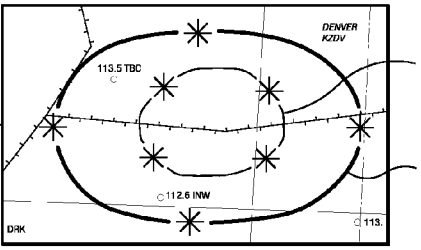 710, 748, 750 | SNOW |
| 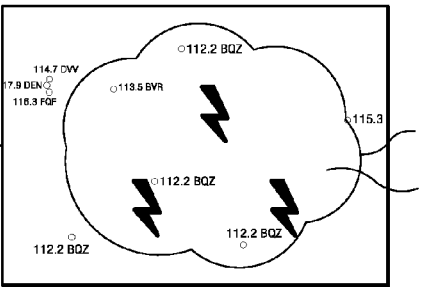 712, 752, 754 | THUNDERSTORM |
| 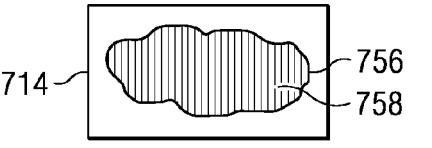 714, 756, 758 | VOLCANIC ASH CLOUD |
700
FIG. 7

| NAME | ALTITUDE CORRESPONDING PHENOMENON INDICATOR |
|---|---|
| TURBULENCE | 802 |
| ICING | 804 |
| VOLCANIC ASH CLOUD | 806 |
| PRECIPITATION (RAIN, SNOW) | RAIN: 808<br>SNOW: 810 |
| LOW VISIBILITY | 812 |
| THUNDERSTORM | 814 |

FIG. 8

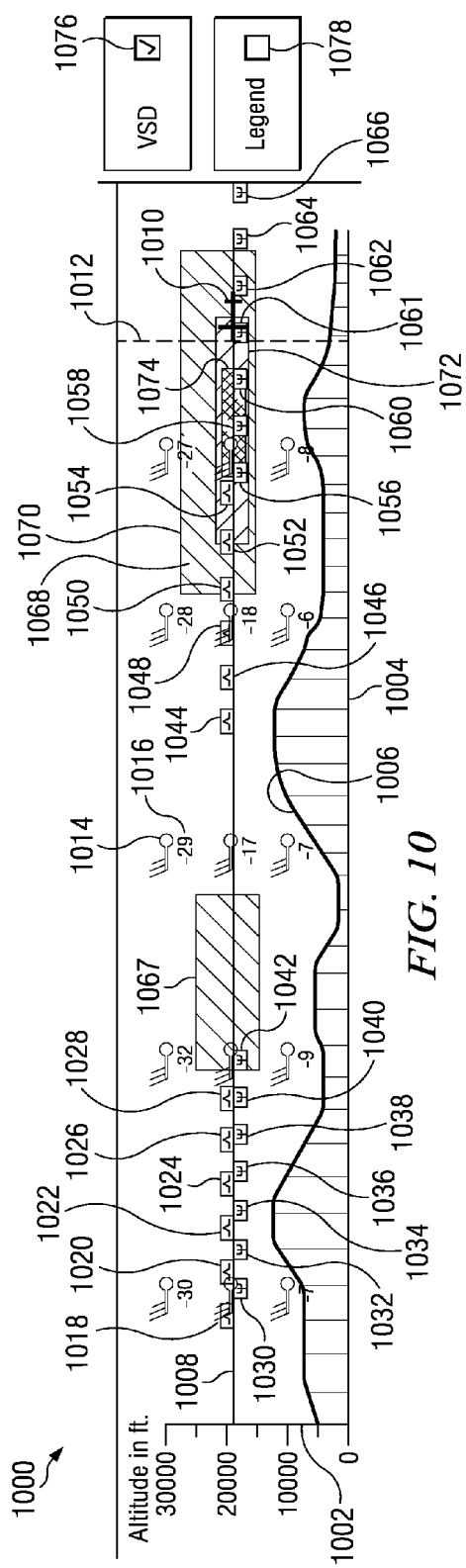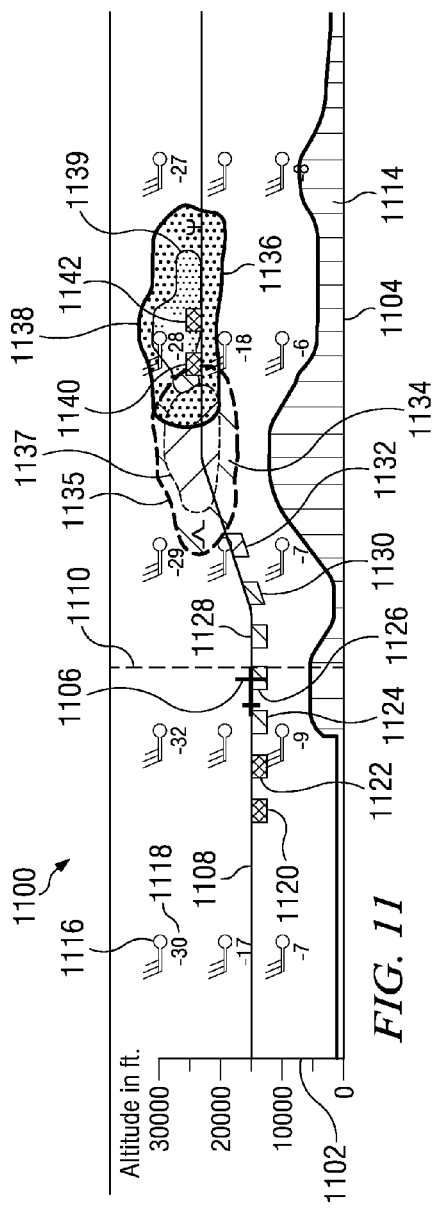

PRESENTING WEATHER INFORMATION ON A DISPLAY

CROSS REFERENCE TO RELATED APPLICATION

The present invention is related to the following patent application: entitled Vertical Situation Display of Weather Information, Ser. No. 12/204,761; filed on Sep. 4, 2008, assigned to the same assignee, and incorporated herein by reference.

BACKGROUND INFORMATION

1. Field

The present disclosure relates generally to an improved data processing system and in particular to a method and apparatus for presenting weather information on a display. Still more particularly, the present disclosure relates to a computer implemented method, apparatus, and computer program code for presenting weather information on an aircraft display.

2. Background

Weather information is used by pilots and other users to plan flights. With weather information and predictions, a flight plan may be created that may avoid undesirable weather such as, for example, thunderstorms, turbulence, and other conditions. Weather information also may be used by pilots and other flight crew during a flight.

This type of information is typically provided in the form of paper charts. If a large number of phenomena or different types of weather conditions overlap, it may be difficult to identify individual phenomena. As a result, weather charts typically only contain a limited or small number of weather phenomena. Multiple charts for the same area may be present to allow for identification of all of the different types of phenomena. Consequently, a pilot may need to consult several different charts to obtain a full picture or identification of the weather situation. This problem also occurs with electronic charts.

As a result, a pilot may have to look at weather information on a number of different charts. Afterwards, the pilot has to mentally integrate the obtained information to obtain a complete picture of the weather situation. This process increases the workload and may take additional time.

Therefore, it would be advantageous to have a method and apparatus that overcomes the problems described above.

SUMMARY

In one advantageous embodiment, a method is present for presenting weather information. A number of weather conditions present for a geographic region is identified from weather data for the geographic region. A geometry is selected for a weather condition within the number of weather conditions based on a type of the weather condition for each of the number of weather conditions to form a number of geometries. Each geometry within the number of geometries has a level of transparency within a corresponding border allowing another geometry to be identified when displayed in an overlapping manner. A spatial extension is selected for the each geometry within the number of geometries based on an extent of an associated weather condition to form the number of geometries. The number of geometries is displayed on a map of the geographic region in which the number of geometries is displayed in locations on the map corresponding to locations of the number of weather conditions in the geographic region.

In another advantageous embodiment, an apparatus comprises a computer system, a display, and a weather display process. The weather display process executes on the computer system. The weather display process identifies a number of weather conditions present for a geographic region from weather data for the geographic region. The weather display process selects a geometry for a weather condition within the number of weather conditions based on a type of the weather condition for each of the number of weather conditions to form a number of geometries. Each geometry within the number of geometries has a level of transparency within a corresponding border allowing another geometry to be identified when displayed in an overlapping manner. The weather display process selects a spatial extension for the each geometry within the number of geometries based on an extent of an associated weather condition to form the number of geometries. The weather display process also displays the number of geometries on a map of the geographic region on the display in which the number of geometries is displayed in locations on the map corresponding to locations of the number of weather conditions in the geographic region.

In yet another advantageous embodiment, a computer program product is present for presenting weather information. The computer program product comprises computer recordable storage media and program code, wherein the program code is stored on the computer readable media. Program code is present for identifying a number of weather conditions present for a geographic region from weather data for the geographic region. Program code is present for selecting a geometry for a weather condition within the number of weather conditions based on a type of the weather condition for each of the number of weather conditions to form a number of geometries. Each geometry within the number of geometries has a level of transparency within a corresponding border allowing another geometry to be identified when displayed in an overlapping manner. Program code also is present for selecting a spatial extension for the each geometry within the number of geometries based on an extent of an associated weather condition to form the number geometries. Program code is present for displaying the number of geometries on a map of the geographic region in which the number of geometries is displayed in locations on the map corresponding to locations of the number of weather conditions in the geographic region.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 6 is a table of weather indicators in accordance with an advantageous embodiment;

FIG. 7 is a table of weather indicators in the form of geometry in accordance with an advantageous embodiment;

FIG. 8 is a diagram of reduced geometries in accordance with an advantageous embodiment;

FIG. 10 is a diagram of a vertical situation display with weather information in accordance with an advantageous embodiment;

FIG. 11 is a diagram of a vertical situation display with weather information in accordance with an advantageous embodiment;

DETAILED DESCRIPTION

Figure 1:
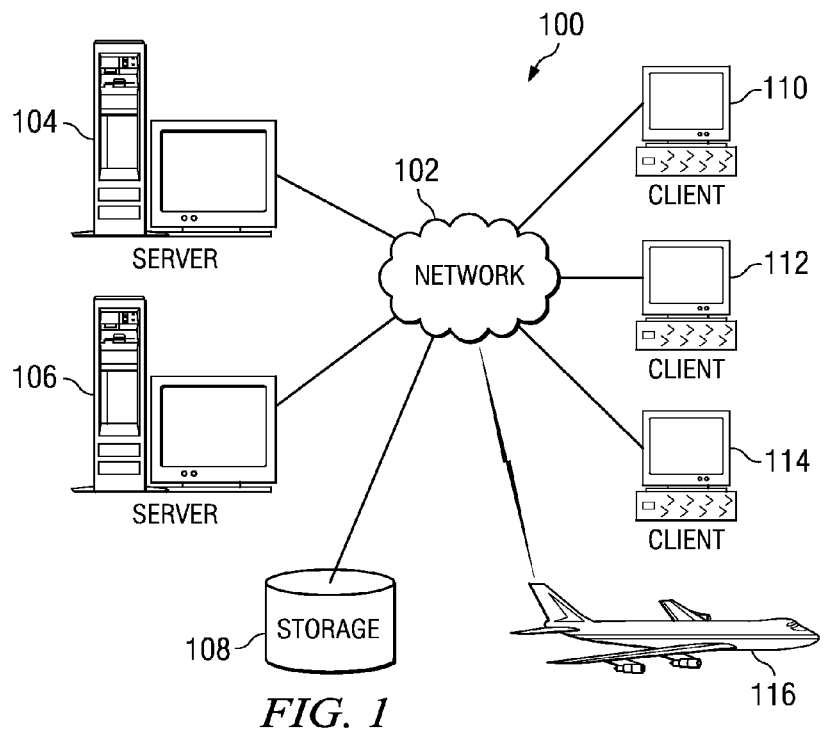
FIG. 1 is a pictorial representation of a network of data processing systems in which the advantageous embodiments of the present invention may be implemented.
Figure 2:
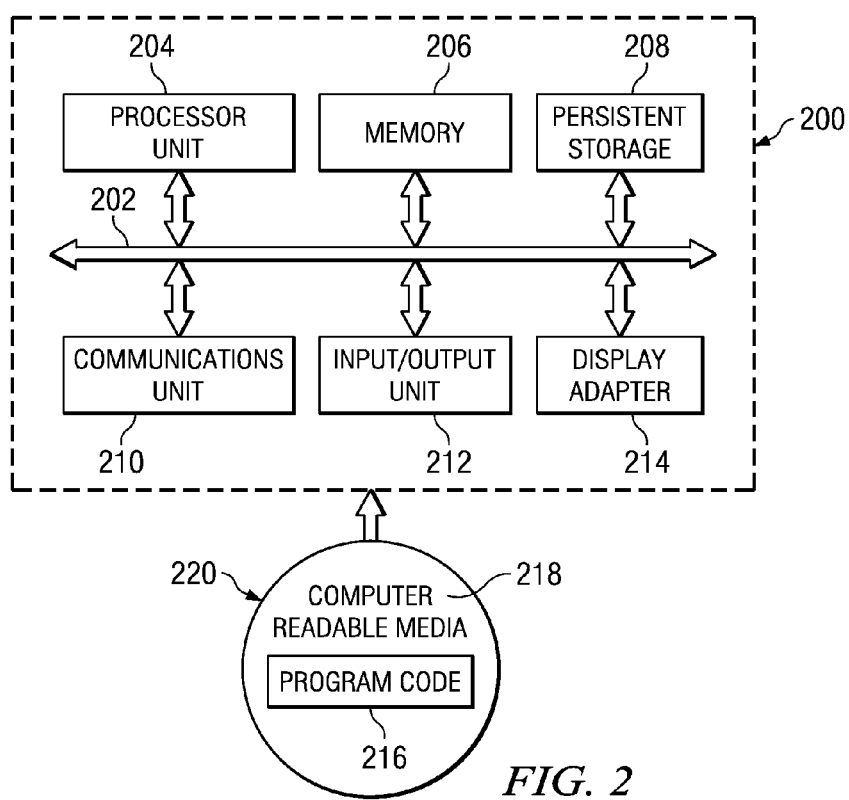
FIG. 2 is a diagram of a data processing system in accordance with an illustrative embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers.

Aircraft 116 may receive weather information from various sources such as those from server 104 and/or storage 108 in accordance with different advantageous embodiments. This weather information may be used to present weather information to pilots and other crew of aircraft 116. Additionally, in some advantageous embodiments, this weather information may be received by client 114 to generate and/or update flight plans for an aircraft such as aircraft 116. The updated flight plans may then be transmitted to aircraft 116. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an illustrative embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display adapter 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse.

Further, input/output unit 212 may send output to a printer. Display adapter 214 provides send to display information to a display device.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form. In yet another, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
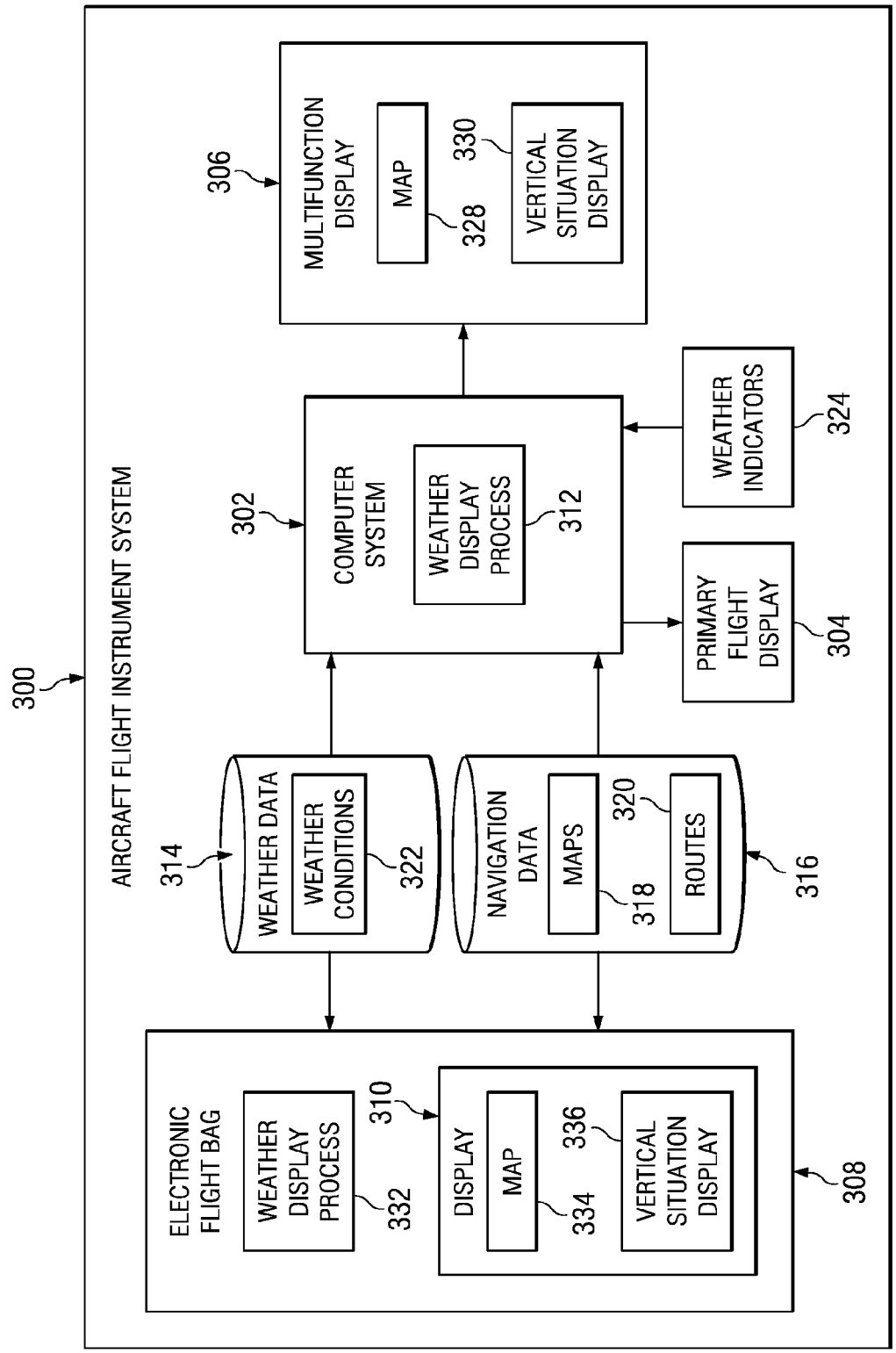
FIG. 3 is a diagram of an aircraft flight instrument system in accordance with an advantageous embodiment.

With reference now to FIG. 3, a diagram of an aircraft flight instrument system is depicted in accordance with an advantageous embodiment. In this example, aircraft flight instrument system 300 may provide information to a pilot and receive commands from a pilot to control an aircraft. Aircraft flight instrument system 300 is an example of an aircraft flight instrument system that may be present in aircraft 116 in FIG. 1.

Aircraft flight instrument system 300 includes computer system 302, primary flight display 304, and multifunction display 306. Aircraft flight instrument system 300 also may include electronic flight bag 308, which may have display 310. Computer system 302 may comprise one or more data processing systems such as, for example, data processing system 200 in FIG. 2.

Primary flight display 304 is a display device that presents information used for flight. This information includes, for example, calibrated air speed, altitude, heading, attitude, vertical speed, and yaw. Primary flight display 304 is designed to improve the situational awareness of a pilot. Multifunction display 306 is another display device that presents navigation and weather information from different systems within computer system 302.

Electronic flight bag 308 is an electronic information management device that helps the pilot and crew perform flight management tasks more easily and efficiently with less paper. Electronic flight bag 308 may be implemented using a data processing system such as, for example, data processing system 200 in FIG. 2. Electronic flight bag 308 may present reference materials such as, for example, an aircraft operating manual, an air crew operating manual, navigation charts, and other suitable information.

In these examples, weather display process 312 may execute on computer system 302 to present weather information in accordance with different advantageous embodiments. In the different illustrative examples, the weather information may be presented on multifunction display 306. Of course, in other advantageous embodiments, this weather information may be presented on other displays connected to computer system 302. For example, this weather information may be presented on a dedicated display.

In one example, weather display process 312 may obtain weather data 314 and navigation data 316. Navigation data 316 may include maps 318 and routes 320. Maps 318 may be, for example, electronic charts or a database of information used to generate maps for a moving map application. Maps 318 may be implemented using any currently available electronic maps and/or map databases. Routes 320 may be, for example, one or more routes for the aircraft.

Weather display process 312 may identify weather conditions 322 from weather data 314 for a particular geographic region. Weather display process 312 selects a number of weather indicators 324 based on weather conditions 322 identified by weather display process 312. The phrase "a number of" when referring to items refers to one or more items. For example, a number of weather indicators is one or more weather indicators.

In these examples, weather display process 312 selects an indicator from weather indicators 324 based on weather conditions 322. Weather display process 312 selects one or more maps from maps 318 and selects one or more weather indicators from weather indicators 324 based on the identification of weather conditions 322 for a particular geographic region.

Weather display process 312 then identifies locations for weather indicators selected from weather indicators 324 based on the locations of weather conditions 322. These locations are geographic locations that may be referenced through terrain and/or navigation data. Weather display process 312 then presents the display of this information on multifunction display 306.

This presentation may take various forms. For example, map 328 may be presented using one or more maps from maps 318 and one or more indicators from weather indicators 324. Map 328 provides a top-end view of weather conditions that may be present. Additionally, a route may be displayed on map 328 to allow an identification of weather conditions that may cross the route or within some selected distance of the route.

Vertical situation display 330 is an example of another form in which information may be displayed. Vertical situation display 330 provides a view that allows a pilot or other crew member to interpret a vertical path of an aircraft. For example, vertical situation display 330 provides a side or profile view of information such as, for example, a terrain that may be below the flight path of an aircraft.

Additionally, in the different advantageous embodiments, vertical situation display 330 is presented with weather indicators from weather indicators 324 based on the identification of weather conditions 322. Further, vertical situation display 330 may present weather indicators 324 in a manner to identify whether a particular route may encounter a weather condition within weather conditions 322.

In the different advantageous embodiments, map 328 may be presented as a moving map with weather display process 312 having moving map functions.

Vertical situation display 330 is displayed on multifunction display 306 with the number of weather indicators in a number of locations on the display corresponding to the locations for the weather conditions.

In other advantageous embodiments, electronic flight bag 308 may execute weather display process 332, generate map 334, and vertical situation display 336 with other information in a similar fashion to the presentation of map 328 and vertical situation display 330.

The illustration of aircraft flight instrument system 300 in FIG. 3 is not meant to imply physical or architectural limitations to the manner in which other advantageous embodiments may be implemented. In other advantageous embodiments, other components may be used in addition to or in place of the ones illustrated in FIG. 3. For example, in other advantageous embodiments, aircraft flight instrument system 300 may also include engine indications and crew alerting system displays. In yet other advantageous embodiments, electronic flight bag 308 may be omitted. As yet another example, weather data 314 and/or navigation data 316 may be located remotely from aircraft flight instrument system 300. In some embodiments, this data may be located remotely from the aircraft.

Figure 4:
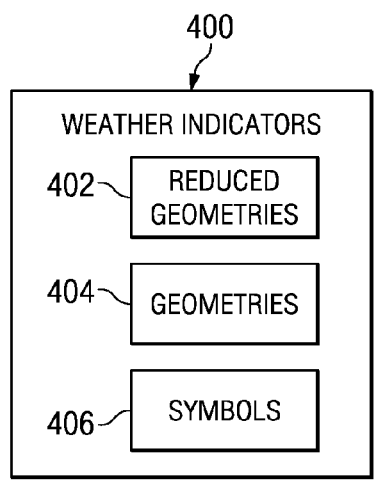
FIG. 4 is a diagram of weather indicators in accordance with an advantageous embodiment.

With reference now to FIG. 4, a diagram of weather indicators is depicted in accordance with an advantageous embodiment. In this example, weather indicators 400 is an illustrative example of one implementation for weather indicators 324 in FIG. 3.

In this example, weather indicators 400 include reduced geometries 402, geometries 404, and symbols 406. The use of reduced geometries 402, geometries 404, and symbols 406 allows for a presentation of a number of different weather conditions that may be simultaneously displayed. This display may be in a manner such that when different weather conditions are located in the same area that a user is capable of identifying the different types of weather conditions.

In these illustrative examples, reduced geometries 402 may be used for a vertical situation display, while geometries 404 and symbols 406 may be used in both map 328 and vertical situation display 330. Of course, depending on the particular implementation, reduced geometries 402 also may be used in map 328.

Reduced geometries 402, geometries 404, and symbols 406 may be color coded to indicate a severity and/or level of a condition. For example, green may indicate a light condition, yellow may indicate a moderate condition, red may indicate a severe condition, and magenta may indicate an extreme condition. Of course, other combinations of colors or numbers of colors may be used to indicate other levels for different conditions. Additionally, in other advantageous embodiments, other types of indicators may be used in addition to or in place of the ones illustrated in FIG. 4.

Figure 5:
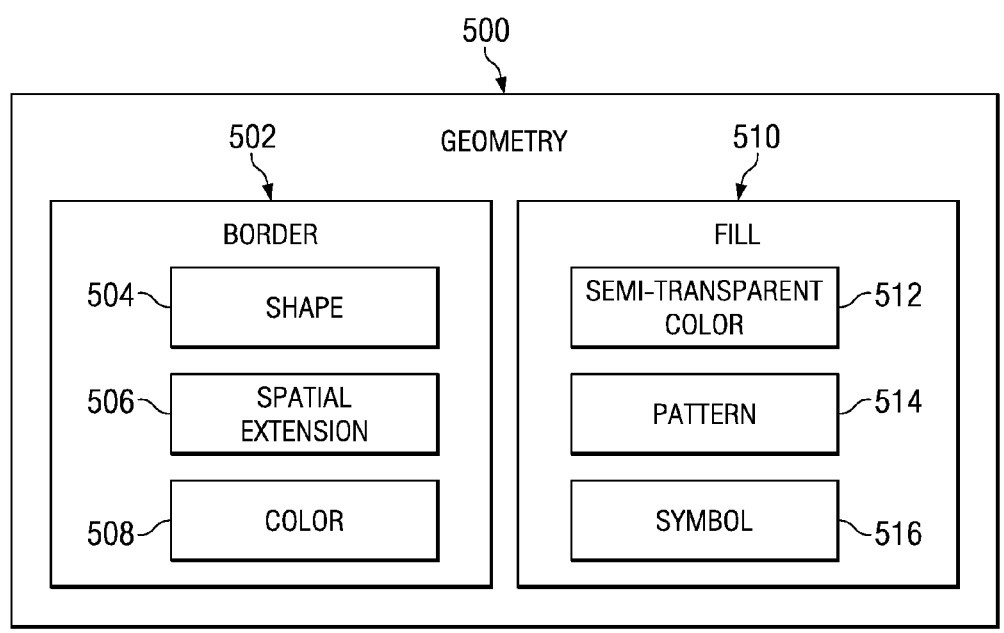
FIG. 5 is a diagram illustrating a geometry in accordance with an advantageous embodiment.

With reference now to FIG. 5, a diagram illustrating a geometry is depicted in accordance with an advantageous embodiment. In this example, geometry 500 is an example of a geometry within geometries 404 in FIG. 4. This illustration of geometry 500 is a block diagram illustrating features that may be present within geometry 500. This illustration is not meant to imply limitations to the manner in which different geometries may be implemented.

In these examples, geometry 500 has border 502, which has shape 504 to indicate spatial extension 506 for a particular weather condition. Border 502 also has color 508. In these examples, color 508 may indicate the level or severity of the particular weather condition. Further, border 502 has spatial extension 506, which is the area in which a weather condition is located.

Border 502 may take various forms. For example, without limitation, border 502 may have a solid line and/or a pattern. For example, the pattern may be dashes, dashes and dots, dashes and a graphical symbol, lines with graphical symbols, lines with different lengths, and/or some other suitable pattern for border 502.

Geometry 500 may also includes fill 510 which is located within border 502. Fill 510 in these examples may be semi-transparent color 512 and/or pattern 514. In yet other advantageous embodiments, fill 510 may have no color for semi-transparent color 512. Further, fill 510 also may include symbol 516 to further aid in identifying the type of weather condition.

In the different advantageous embodiments, geometry 500 is designed such that geometry 500 may be overlapped and/or overlaid partially or entirely on another geometry in a manner that the weather conditions identified by the two different geometries may be discernable to a user even with the overlap.

As yet another example, if two levels of severity are present for geometry 500, these levels may be identified by having two borders and two fills. The borders and/or fills may have different colors to identify the difference in severity or level of the particular weather condition for geometry 500. Further, geometry 500 also may be identifiable from other geometries when more than two different geometries are partially or entirely overlaid on each other in these examples.

In this manner, the use of a geometry such as, for example, geometry 500 may provide a graphical representation of weather information that allows for the overlap depiction of several different types of weather conditions at the same time and at the same place in a manner that allows each weather condition to be discerned and identified. Further, a presentation of geometries may be correlated with information relevant to a flight such as, for example, particular navigation and/or terrain information.

The illustration of geometry 500 in FIG. 5 is not meant to imply architectural limitations to the manner in which different geometries may be implemented. For example, some geometries may include additional or fewer features than those illustrated. In addition, other features may be used in place of the illustrated features. For example, in some advantageous embodiments, symbol 516 may not be used within fill 510. In yet other advantageous embodiments, border 502 may incorporate symbol 516 as part of border 502.

With reference now to FIG. 6, a table of weather indicators is depicted in accordance with an advantageous embodiment. In this example, table 600 contains examples of symbols such as, for example, jet stream 602, tropical depression 604, tropical storm 606, hurricane 608, wind 610, and temperatures 612. In the different advantageous embodiments, these symbols may take the form of solid filled figures.

With reference now to FIG. 7, a table of weather indicators in the form of a geometry is depicted in accordance with an advantageous embodiment. Table 700 provides examples of implementations for geometry 500 in FIG. 5. The geometries depicted in table 700 are illustrative examples of geometries that may be found in weather indicators 324 in FIG. 3. In this example, geometries within table 700 include visibility 702, icing 704, turbulence 706, rain 708, snow 710, thunderstorm 712, and volcanic ash cloud 714.

In this example, in visibility 702, border 716 and border 718 are solid lines that show the spatial extent of visibility 702. In this illustrative example, two different levels of severity are shown for visibility 702. Fill 720 and fill 722 are a semi-transparent color in these examples. The degree of visibility or the severity of loss of visibility may be indicated by the colors of borders 716 and 718. Of course, in other advantageous embodiments, the colors of fill 720 and 722 also may be used to indicate severity.

Icing 704 has three levels of severity in this example. These levels may be delineated by borders 724, 726, and 727. These borders take the form of solid lines with fill 728 and fill 730. In this example, fill 728 and fill 730 are a pattern that takes the form of dots. Icing 704 also has symbol 731, which may aid in identifying this geometry. The colors of borders 724, 726, and 727 are used to indicate the severity of icing in this illustrative example. In other illustrative embodiments, the color of the dots in fill 728 and the color of the dots in fill 730 may be used to indicate the severity of the condition.

Turbulence 706 has two levels of turbulence and may be delineated by border 732 and border 734. Fill 736 and fill 738 are present. In this example, border 732 and 734 take the form of dashed lines to identify the extent of turbulence 706. Fill 736 and fill 738 are in the form of a pattern which has stripes or hash marks. The colors of border 732 and border 734 may identify the severity or degree of turbulence. In other advantageous embodiments, fill 736 and fill 738 may have colors used to identify the severity or degree of turbulence. In this example, symbol 739 is present within turbulence 706 and aids in identifying this type of geometry.

Rain 708 has border 740 and border 742 with fill 744 and fill 746. In this example, borders 740 and 742 are lines with dashes and dots. Snow 710 contains borders 748 and 750. Borders 748 and 750 contain lines with snow flakes to identify snow 710. The severity or level of rain 708 and snow 710 may be indicated through the colors of the borders and/or fills.

Thunderstorm 712 includes border 752 with fill 754. Border 752 takes the form of a scalloped outline with fill 754 being a pattern in the form of lightning bolts. Volcanic ash cloud 714 has border 756 and fill 758, which is a semi-transparent color. The severity or level of thunderstorm 712 and/or volcanic ash cloud 714 may be indicated through the color of the borders and/or fills.

With reference now to FIG. 8, a diagram of reduced geometries is depicted in accordance with an advantageous embodiment. In this example table 800 contains examples of indicators that may be found in weather indicators 324 in FIG. 3. The reduced geometries illustrated in table 800 are an example of some implementations for reduced geometries 402 in FIG. 4.

In this example, table 800 includes turbulence 802, icing 804, volcanic ash cloud 806, rain 808, snow 810, low visibility 812, and thunderstorms 814. These different indicators are examples of reduced geometries that may be used on a vertical situation display to identify different types of weather conditions.

The symbols located within these indicators are similar to the symbols shown for the fills with corresponding geometries in table 700 in FIG. 7. These reduced geometries may be used in place of the geometries in table 700 in a vertical situation display in these examples. In other advantageous embodiments, reduced geometries may also be used in a horizontal display. Further, these reduced geometries may be color coded to indicate severity in a fashion similar to geometry 500.

The illustrations of the different weather indicators in FIGS. 6-8 are not meant to imply architectural limitations to the manner in which different indicators may be implemented. These different examples are merely illustrative examples and are not an exhaustive list of the different types of geometries, reduced geometries, and symbols that may be used.

Figure 9:
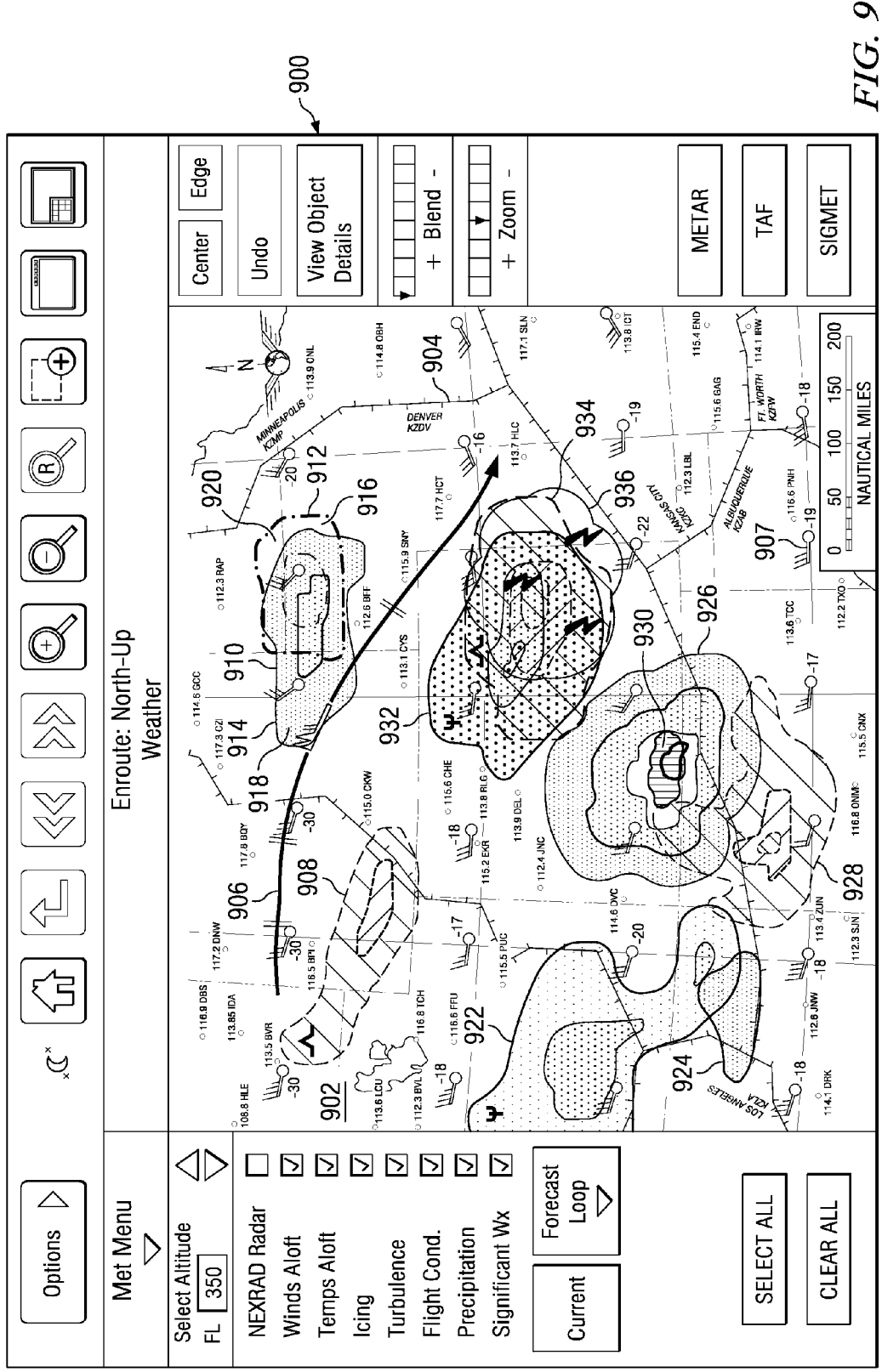
FIG. 9 is a diagram of a map in accordance with an advantageous embodiment.

With reference now to FIG. 9, a diagram of a map is depicted in accordance with an advantageous embodiment. In this example, map 900 is an example of a map that may be presented in multifunction display 306 in FIG. 3 as generated by weather display process 312 in FIG. 3.

In this illustrative example, map 900 illustrates terrain 902 and navigation information 904. A number of different weather conditions are displayed using various weather indicators in map 900. For example, symbol 906 identifies a jet stream, while symbol 907 identifies wind.

In this example, geometry 908 identifies a presence of turbulence. Geometry 910 indicates a presence of visibility problems, while geometry 912 identifies a presence of precipitation in the form of rain. As can be seen, geometry 910 overlaps geometry 912. The extent of geometry 910 and 912 may be identified using border 914 for geometry 910 and border 916 for geometry 912.

As can be seen, different types of borders are used to distinguish the different between the different geometries. Further, fill 918 for geometry 910 is a semi-transparent color, while fill 920 is transparent. In this manner, the extent of each type of weather condition represented by geometry 910 and geometry 912 can be distinguished or identified even though these geometries overlap.

Geometry 922 indicates the presence of icing. Geometry 924 indicates the presence of visibility problems. As can be seen, the extent and identification of these two weather conditions can be made even though these two geometries overlap each other.

As another example, on map 900, geometry 926 identifies a presence of lower visibility. Geometry 928 identifies a presence of turbulence. Geometry 930 identifies a presence of a volcanic ash cloud. These different weather conditions and their extent can be identified even though the different geometries overlap. Geometry 932 indicates a presence of icing, geometry 934 indicates a presence of turbulence, while geometry 936 identifies a presence of thunderstorms. Even with multiple overlaps in geometries, the different types of weather conditions and their extent still may be identified through the selection of borders and fills for the different geometries.

With reference now to FIG. 10, a diagram of a vertical situation display with weather information is depicted in accordance with an advantageous embodiment.

In this depicted example, vertical situation display 1000 is an example of one implementation or one manner in which vertical situation display 330 displayed within multifunction display 306 by weather display process 312 may be presented. In this example, vertical situation display 1000 includes altitude axis 1002 and distance axis 1004, along with terrain profile 1006. Vertical situation display 1000 also includes route 1008, aircraft 1010, and flight progress indicator 1012.

In addition, weather indicators are present in the form of symbols, reduced geometries, and geometries. In this example, symbols such as symbols 1014 and 1016 indicate wind and temperature, respectively.

Reduced geometries 1018, 1020, 1022, 1024, 1026, and 1028 are associated with route 1008. These symbols are associated with route 1008 through a portion each of the symbols touching route 1008 in these illustrative examples. These symbols indicate a presence of icing along different locations on distance axis 1004. Reduced geometries 1030, 1032, 1034, 1036, 1038, 1040, and 1042 indicate a presence of turbulence along different portions of route 1008 that may be encountered by aircraft 1010.

Reduced geometries 1044, 1046, 1048, 1050, 1052, and 1054 indicate a presence of icing along routes 1008. Reduced geometries 1056, 1058, 1060, 1061, 1062, 1064, and 1066 indicate a presence of turbulence on different portions of route 1008. In addition to reduced geometries, vertical situation display 1000 also includes geometry 1067 and geometry 1068 to indicate a presence of different visibility levels. Geometry 1068 includes borders 1070, 1072, and 1074 to identify different levels of visibility within geometry 1068.

Vertical situation display 1000 also includes control 1076 and control 1078. Control 1076 may be selected to display vertical situation display 1000 or to remove or terminate the display. Control 1078 may be selected to present a legend. This legend may include an identification of the different symbols, reduced geometries, and geometries.

With reference now to FIG. 11, a diagram of a vertical situation display with weather information is depicted in accordance with an advantageous embodiment. In this example, vertical situation display 1100 is another example of a vertical situation display 330 in FIG. 3.

In this illustrative example, vertical situation display 1100 includes altitude axis 1102 and distance axis 1104. Aircraft 1106 is shown on route 1108 along with flight progress indicator 1110. As can be seen in the example, route 1108 is depicted as having a change in altitude during the flight of aircraft 1106. Terrain 1114 is also presented relative to aircraft 1106 and route 1108.

In these examples, weather indicators displayed in vertical situation display 1100 may include symbols such as, for example, symbols 1116 and 1118, which identify wind and temperature, respectively. In this example, weather indicators also may take the form of reduced geometries such as reduced geometries 1120, 1122, 1124, 1126, 1128, 1130, and 1132. These reduced geometries indicate visibility conditions. The amount of reduced visibility may be indicated through the use of colors in these examples.

Additionally, geometry 1134 and geometry 1136 are presented in vertical situation display 1100. Geometry 1134 indicates a presence of turbulence, while geometry 1136 includes a presence of icing. Geometry 1134 has borders 1135 and 1137, which may indicate the severity of turbulence. Geometry 1136 has borders 1138 and 1139, which may indicate the severity of icing. Further, reduced geometries 1140 and 1142 indicate a presence of a thunderstorm within these reduced geometries. As can be seen, although the different weather indicators overlap each other, identification of the different types of weather conditions can be discerned by the user.

The illustration of the different displays in FIGS. 9-11 are not meant to imply limitations to the manner in which different advantageous embodiments may be implemented. For example, in other advantageous embodiments, map 900 may be displayed without route information. In still other advantageous embodiments, a user may be provided with a capability to select between viewing reduced geometries and full-size geometries. For example, the user may select a reduced geometry to expand to a full-size geometry that shows the spatial extent of the particular weather condition. In yet another advantageous embodiment, the user may reduce the size of the full-size geometry to a reduced geometry depending on the particular implementation.

Figure 12:
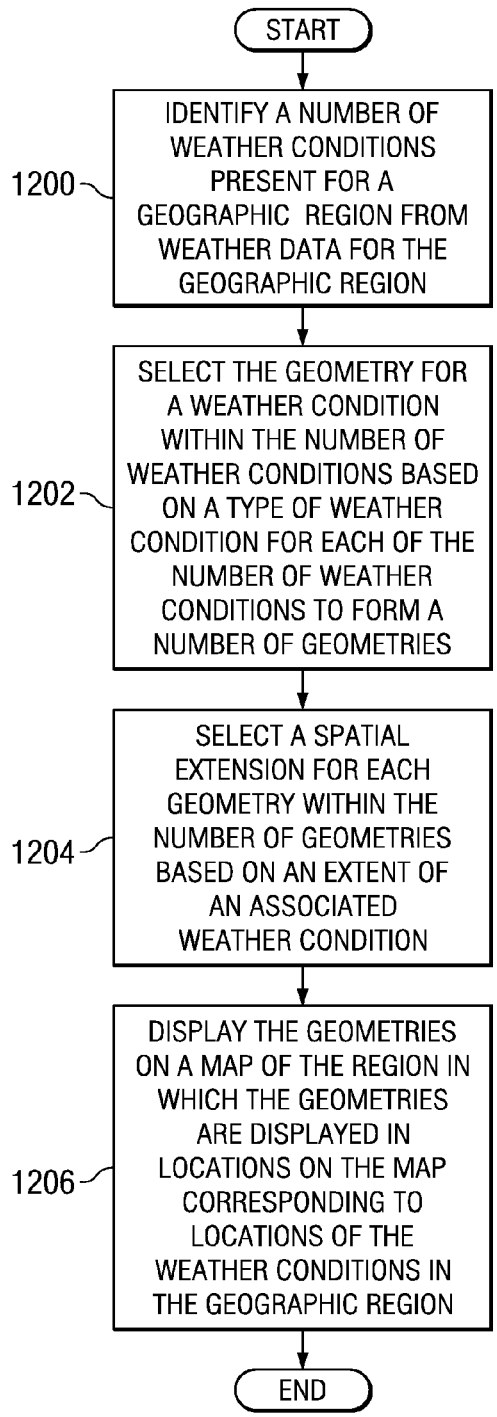
FIG. 12 is a flowchart of a process for presenting weather information in accordance with an advantageous embodiment.

With reference now to FIG. 12, a flowchart of a process for presenting weather information is depicted in accordance with an advantageous embodiment. The process illustrated in FIG. 12 is an example of a process that may be implemented in weather display process 312 in FIG. 3. This process may be executed or performed to generate a display such as, for example, map 900 in FIG. 9.

The process begins by identifying a number of weather conditions present for a geographic region from weather data for the geographic region (operation 1200). The process then selects the geometry for a weather condition within the number of weather conditions based on a type of weather condition for each of the number of weather conditions to form a number of geometries (operation 1202). Each geometry within the number of geometries has a level of transparency that corresponds with a border to allow another geometry to be identified when displayed in an overlapping manner. The level of transparency may be set by the fill for a geometry and/or some other feature. The fill may have a color with some level of transparency. In some embodiments, the fill may be entirely transparent. Also, the fill may include a pattern.

The process selects a spatial extension for each geometry within the number of geometries based on an extent of an associated weather condition (operation 1204). The process displays the geometries on a map of the region in which the geometries are displayed in locations on the map corresponding to locations of the weather conditions in the geographic region (operation 1206).

Figure 13:
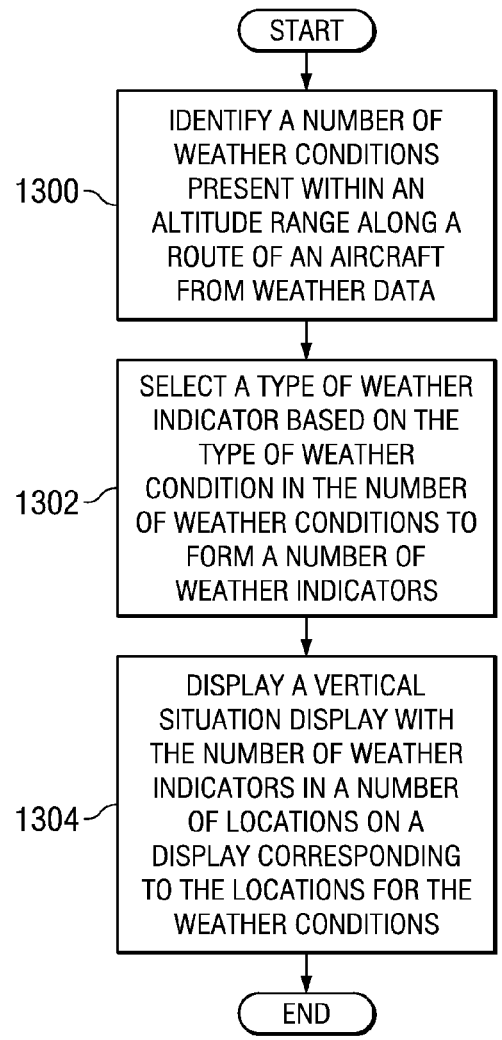
FIG. 13 is a flowchart of a process for displaying weather information in accordance with an advantageous embodiment.

With reference now to FIG. 13, a flowchart of a process for displaying weather information is depicted in accordance with an advantageous embodiment. The process illustrated in FIG. 13 may be implemented using a process such as, for example, weather display process 312 in FIG. 3. This process may be executed or run to generate a display such as, for example, vertical situation display 1000 in FIG. 10 and/or vertical situation display 1100 in FIG. 11.

The process begins by identifying a number of weather conditions present within an altitude range along a route of an aircraft from weather data (operation 1300). The process selects a type of weather indicator based on the type of weather condition in the number of weather conditions to form a number of weather indicators (operation 1302).

The process then displays a vertical situation display with the number of weather indicators in a number of locations on a display corresponding to the locations for the weather conditions (operation 1304) with the process terminating thereafter.

Figure 14:
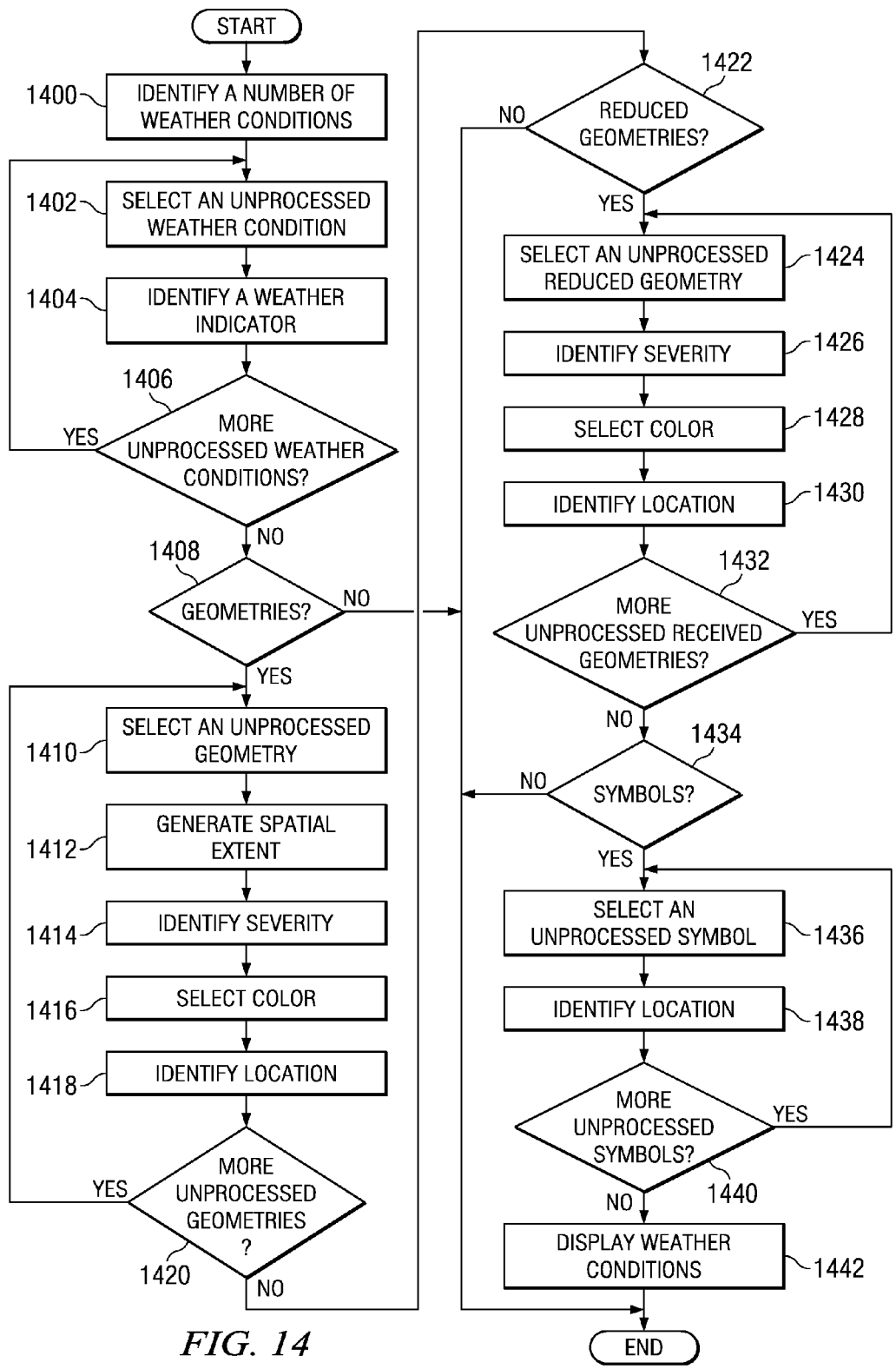
FIG. 14 is a flowchart of a process for displaying weather conditions in accordance with an advantageous embodiment.

With reference now to FIG. 14, a flowchart of a process for displaying weather conditions is depicted in accordance with an advantageous embodiment. The process illustrated in FIG. 14 may be implemented in a process such as, for example, weather display process 312 in FIG. 3.

The process begins by identifying a number of weather conditions (operation 1400). These weather conditions may be identified using weather information from a weather database or some other source. The process selects an unprocessed weather condition from the weather conditions (operation 1402).

The process then identifies a weather indicator for use with the selected weather condition (operation 1404). This weather indicator may take various forms. For example, a symbol, a reduced geometry, or a geometry may be used. In these advantageous embodiments, the selection of a weather indicator is performed based on the spatial extent of the weather condition. In general, weather phenomena with a small spatial extent are represented by a geometry. On the other hand, weather phenomena with a small spatial extent are identified by a symbol. Reduced geometries may be used to decrease the consumption of display real estate or display space, while displaying weather information. In these illustrative examples, the pilot of the aircraft may have the capability to configure whether the weather phenomena are presented by reduced geometries or full-size geometries.

The process determines whether more unprocessed weather conditions are present (operation 1406). If additional weather conditions are present, the process returns to operation 1402.

Otherwise, the process determines whether geometries have been identified for a weather condition (operation 1408). If geometries have not been identified, the process then terminates. If one or more geometries have been identified, the process then selects an unprocessed geometry for processing (operation 1410).

The process generates a spatial extension for the geometry (operation 1412). The spatial extension is based on the extent of the weather condition associated with the geometry. The process then identifies the severity of the weather condition (operation 1414). A color is then selected based on the severity (operation 1416). This color may be selected for a border and/or fill of the geometry depending on the particular implementation.

The process then identifies a location for the geometry (operation 1418). This location is used to display the geometry on a map with respect to terrain or navigation information to indicate the extent of the weather condition over those different regions. The process determines whether additional unprocessed geometries are present (operation 1420). If additional unprocessed geometries are present, the process returns to operation 1410.

If, in operation 1420, additional unprocessed geometries are not present, the process determines whether reduced geometries have been identified for use as weather indicators (operation 1422). If reduced geometries have not been identified, the process then terminates. Otherwise, if reduced geometries have been identified, the process selects an unprocessed reduced geometry (operation 1424). The process identifies a severity for the reduced geometry that has been selected for processing (operation 1426). Based on the severity, the process selects a color (operation 1428). This color is used to indicate the severity of the weather condition for the reduced geometry.

The process then identifies a location for the reduced geometry (operation 1430). With respect to use in a vertical situation display, this location may be associated with a distance axis on which a route is displayed. The process determines whether additional unprocessed reduced geometries are present (operation 1432). If additional unprocessed geometries are present, the process returns to operation 1424. Otherwise, a determination is made as to whether symbols have been identified for use as weather indicators (operation 1434). If symbols have not been identifies, the process then terminates.

If symbols have been identified, an unprocessed symbol is selected for processing (operation 1436). A location is identified for the symbol (operation 1438). The process then determines whether additional unprocessed symbols are present (operation 1440). If additional unprocessed symbols are present, the process returns to operation 1436. Otherwise, the process displays the weather conditions on a display (operation 1442), with the process terminating thereafter. This display may be on a map and/or vertical situation display.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method, apparatus, and computer program code for displaying or presenting weather information. In the different advantageous embodiments, different weather conditions are identified for a geographic region from weather data for that geographic region. Geometries may be selected for a weather condition based on the type of weather condition. A spatial extension may be selected for each geometry based on the extent of the weather condition. These geometries may be displayed on the map in locations corresponding to locations for the weather conditions. The geometries are created such that overlaps of different geometries may still allow for the identification of the different weather conditions. In these examples, each geometry may have a level of transparency that is located within a corresponding border.

Further, the different advantageous embodiments may identify weather conditions present within an altitude range along a route of an aircraft. A type of weather indicator may be selected based on the type of weather condition. The weather indicators may be displayed on the vertical situation display based on locations of those weather conditions.

In this manner, one or more of the different advantageous embodiments provide features that increase the ease with which different weather conditions may be identified. The different advantageous embodiments provide a capability to identify multiple weather conditions that may be present within a particular location. The display of different weather indicators is selected such that the overlap of those weather indicators may still allow the different weather conditions to be distinguished from each other as well as be identified. Further, the extent of the different weather conditions may still be viewed within the overlaps in these different examples.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for presenting weather information, the method comprising:
    identifying a plurality of weather conditions present for a geographic region from weather data for the geographic region;
    selecting a first geometry comprising a first spatial extension, wherein the first geometry is for a first weather condition within the plurality of weather conditions, wherein the first geometry is based on a first type of the first weather condition, and wherein the first geometry has a first level of transparency within the first spatial extension;
    selecting a first color for the first geometry based on a severity of the first weather condition, wherein the color selected is for a first border of the first geometry;
    selecting a second geometry comprising a second spatial extension, wherein the second geometry is for a second weather condition within the plurality of weather conditions, wherein the second geometry is based on a second type of the second weather condition, wherein the second geometry has a second level of transparency within the second spatial extension, and wherein the first spatial extension and the second spatial extension overlap at least in part; and
    displaying the first geometry and the second geometry on a map of the geographic region.

2. The method of claim 1 further comprising:
    displaying a location of an aircraft on the map.

3. The method of claim 1 further comprising:
    displaying a route of an aircraft on the map.

4. The method of claim 1 further comprising:
    displaying at least one of terrain information and navigation information on the map.

5. The method of claim 1, wherein the map is a moving map.

6. The method of claim 1, wherein the first geometry comprises a first line type for a first border defining the first spatial extension and a first type of fill within the first spatial extension.

7. The method of claim 6, wherein the first geometry further comprises a symbol.

8. The method of claim 1 further comprising:
    displaying a legend for the first geometry and the second geometry.

9. The method of claim 1, wherein the type of weather condition is selected from one of turbulence, icing, precipitation, volcanic ash, low visibility, and thunder storms.

10. An apparatus comprising:
    a display; and
    a computer system configured to execute a weather display process, wherein the weather display process identifies a plurality of weather conditions present for a geographic region from weather data for the geographic region; selects a first geometry comprising a first spatial extension, wherein the first geometry is for a first weather condition within the plurality of weather conditions, wherein the first geometry is based on a first type of the first weather condition, and wherein the first geometry has a first level of transparency within the first spatial extension; selects a first color for the first geometry based on a severity of the first weather condition, wherein the color selected is for a first border of the first geometry; selects a second geometry comprising a second spatial extension, wherein the second geometry is for a second weather condition within the plurality of weather conditions, wherein the second geometry is based on a second type of the second weather condition, wherein the second geometry has a second level of transparency within the second spatial extension, and wherein the first spatial extension and the second spatial extension overlap at least in part; and displays the first geometry and the second geometry on a map of the geographic region on the display.

11. The apparatus of claim 10, wherein the weather display process displays a location of an aircraft and a route of the aircraft on the map.

12. The apparatus of claim 10, wherein the weather display process selects a first color for the first geometry based on a severity of the first weather condition.

13. The apparatus of claim 12, wherein the first geometry comprises a first line type for a first border defining the first spatial extension and a first type of fill within the first spatial extension.

14. The apparatus of claim 10, further comprising:
an aircraft, wherein the computer system and the display are located within the aircraft.

15. A non-transitory computer recordable storage media storing a computer program product for presenting weather information, the computer program product comprising:
program code, stored on the non-transitory computer recordable storage media, for identifying a plurality of weather conditions present for a geographic region from weather data for the geographic region;
program code, stored on the non-transitory computer recordable storage media, for selecting a first geometry comprising a first spatial extension, wherein the first geometry is for a weather condition within the plurality of weather conditions, wherein the first geometry is based on a first type of the first weather condition, and wherein the first geometry has a first level of transparency within the first spatial extension;
program code, stored on the non-transitory computer readable storage medium, for selecting a first color for the first geometry based on a severity of the first weather condition, wherein the color selected is for a first border of the first geometry;
program code, stored on the non-transitory computer recordable storage media, for selecting a second geometry comprising a second spatial extension, wherein the second geometry is for a second weather condition within the plurality of weather conditions, wherein the second geometry is based on a second type of the second weather condition, wherein the second geometry has a second level of transparency within the second spatial extension, and wherein the first spatial extension and the second spatial extension overlap at least in part; and
program code, stored on the non-transitory computer recordable storage media, for displaying the first geometry and the second geometry on a map of the geographic region.

16. The non-transitory computer recordable storage media of claim 15, further comprising:
program code, stored on the non-transitory computer recordable storage media, for displaying a location of an aircraft on the map.

17. The non-transitory computer recordable storage media of claim 15, further comprising:
program code, stored on the non-transitory computer recordable storage media, for displaying a route of an aircraft on the map.

18. The non-transitory computer recordable storage media of claim 15 further comprising:
program code, stored on the non-transitory computer recordable storage media, for displaying at least one of terrain information and navigation information on the map.

* * * * *